(12) United States Patent
Troupe

(10) Patent No.: US 8,391,486 B2
(45) Date of Patent: Mar. 5, 2013

(54) SECURE KEY DISTRIBUTION USING SEQUENTIAL WEAK VALUES

(75) Inventor: James E. Troupe, Woodford, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 77 days.

(21) Appl. No.: 13/068,466

(22) Filed: Apr. 28, 2011

(65) Prior Publication Data

US 2012/0314863 A1 Dec. 13, 2012

(51) Int. Cl.
*H04L 29/06* (2006.01)
(52) U.S. Cl. .......................... 380/256; 380/255; 380/263
(58) Field of Classification Search .................. 380/255, 380/256, 263
See application file for complete search history.

(56) References Cited

U.S. PATENT DOCUMENTS

| 5,675,648 | A | 10/1997 | Townsend | 380/21 |
| 5,953,421 | A | 9/1999 | Townsend | 380/21 |
| 6,522,749 | B2 | 2/2003 | Wang | 380/263 |
| 7,305,091 | B1 | 12/2007 | Hirano | 380/255 |
| 7,359,514 | B2 * | 4/2008 | Trifonov et al. | 380/256 |
| 7,583,803 | B2 | 9/2009 | Trifonov | 380/278 |
| 7,864,958 | B2 | 1/2011 | Harrison et al. | 380/256 |

OTHER PUBLICATIONS

Deng Fu-Guo/Liu Xiao-Shu/Ma Ying-Jun/Xiao Li/Long Gui-Lu, A Theoretical Scheme for Multi-user Quantum Key Distribution with N Winstein-Podolsky-Rosen Pairs on a Passive Optical NEtwork, 2002 pp. 893-896.*

C. H. Bennett et al., "Quantum Cryptography: Public key distribution and Coin Tossing", *IEEE Int'l Conf on Computers Systems & Signal Processing*, Dec. 1984.
Y. Aharonov et al., "How the Result of a Measurement of a Component of the Spin of a Spin—1/2 Particle Can Turn Out to be 100", *Phys. Rev. Ltrs*, 60 (1988), 14 1351-54. http://www.tau.ac.il/~vaidman/Ivhp/m8.pdf.
Y. Aharonov et al., "Properties of a quantum system . . . " *Phys. Rev. A*, 41 (1990) 11. http://pra.aps.org/pdf/PRA/v41/i1/p11_1.
B. Reznik et al., "On a Time Symmetric formulation of Quantum Mechanics", *Phys. Rev. A*, 52 (1995) 2538. http://arxiv.org/PS_cache/quant-ph/pdf/9501/9501011v2.pdf.
Y. Aharonov et al., "Revisiting Hardy's Paradox: Counterfactual Statements, Real Measurements, Entanglement and Weak Values", *Phys. Ltrs. A*, 301 (2002) 130. http://arxiv.org/PS_cache/quant-ph/pdf/0104/0104062v1.pdf.

(Continued)

*Primary Examiner* — Brandon Hoffman
*Assistant Examiner* — Michael D Anderson
(74) *Attorney, Agent, or Firm* — Gerhard W. Thielman, Esq

(57) ABSTRACT

A method is provided for distributing a random list of binary values between first and second parties. The method includes sending photons from the second party into an interferometer at a first beam splitter; performing a first weak measurement on photons as a first pointer result into a first time-ordered list for photons; performing a second weak measurement by the first party on photons that pass through a second beam splitter as being a second pointer result into a second time-ordered list; recording identification for first and second detectors that the photons arrive via a third beam splitter as respective first and second detector registrations for collecting in a third time-ordered list as respective first and second detection lists; determining first and second averages of the respective first and second detection lists; and comparing the averages to verify existence of a non-trivial difference that indicates secure communication status of the element's binary value.

22 Claims, 1 Drawing Sheet

OTHER PUBLICATIONS

K. Yokota et al., "Direct observation . . . ", *New J. of Phys.*, 11 (2009) 033011. http://d.yimg.com/kq/groups/2385221/256584917/name/HardyParanjp9_3_033011.pdf.

J. Lundeen et al., "Experimental Joint Weak Measurement . . . ", *Phys. Rev. Ltrs.*, 102 (2009) 020404. http://arxiv.org/PS_cache/arxiv/pdf/0810/0810.4229v1.pdf.

D. Starling et al., "Precision frequency measurements", *Phys. Rev. A*, 82 (2010) 062822. http://www.pas.rochester.edu/~jhgroup/papers/starling-pra-10-12.pdf.

N. Brunner et al., "Measuring small longitudinal phase shifts . . . ", *Phys. Rev. Ltrs.*, 105 (2010) 010405. http://arxiv.org/PS_cache/arxiv/pdf/0911/0911.5139v2.pdf.

C. Bennett et al., "Generalized Privacy Amplification", *IEEE Trans. on Info. Theory*, 41 (1995) 1915. http://citeseerx.ist.psu.edu/viewdoc/summary?doi=10.1.1.47.282.

J. Tollaksen, "Pre- and post-selection . . . ", *J. of Phys. A*, 40 (2007) 9033. http://iopscience.iop.org/1751-8121/40/30/025/pdf/1751-8121_40_30_025.pdf.

G. Mitchison et al., "Sequential weak measurement", *Phys. Rev. A*, 76 (2007) 062105. http://arxiv.org/PS_cache/arxiv/pdf/0706/0706.1508v2.pdf.

Tollaksen et al., "Quantum interference experiments . . . ", *New J. of Phys.*, 12 (2010) 013023. http://arxiv.org/PS_cache/arxiv/pdf/0910/0910.4227v1.pdf.

\* cited by examiner

SECURE KEY DISTRIBUTION USING SEQUENTIAL WEAK VALUES

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to quantum communication (QC). In particular, this invention relates to quantum key distribution using weak measurement of sequentially emitted photons.

Secure communication involves exchange of information between intended communicants, e.g., Alice and Bob, without an eavesdropper, e.g., Eve, from unauthorized interception of the information message. Quantum cryptography represents an example of this process. Such methods include development of conventional quantum key distribution (QKD) protocol. Separately, weak measurements of quantum states have been investigated for various purposes.

The earliest conventional QKD protocol involves a method of securely communicating a private key from one party to another for use in onetime pad encryption. This procedure is documented by Charles Bennett and Gilles Brassard in "Quantum Cryptography: Public Key Distribution and Coin Tossing", at the *International Conference on Computers, Systems & Signal Processing*, December 1984, and commonly referred to as BB84. See http://www.research.ibm.com/people/b/bennetc/bennettc198469790513.pdf for details.

The weak value of an observable of a quantum system at an intermediate time is equally determined by both the initial state of the system and the state resulting from a final projective measurement. In this manner, the weak value contains a signature of the correlations between past and future states of the system. The time-symmetric formulation of quantum mechanics first introduced the concepts of weak measurement and weak values. See Y. Aharonov et al. "How . . . measurement . . . ", *Phys. Rev. Ltrs.*, 60 (1988) 1351; Y. Aharonov et al., "Properties of a quantum system . . . " *Phys. Rev. A*, 41 (1990) 11; B. Reznik et al., "On the time symmetric formulation . . . ", *Phys. Rev. A*, 52 (1995) 2538. While debate continues over the meaning of weak values, their utility has been experimentally demonstrated in many areas, particularly in relation to Hardy's Paradox. See Y. Aharonov et al., "Revisiting Hardy's Paradox . . . ", *Phys. Ltrs. A*, 301 (2002) 130; K. Yokota et al., "Direct observation . . . ", *New J. of Phys.*, 11 (2009) 033011; J. Lundeen et al., "Experimental Joint Weak Measurement . . . ", *Phys. Rev. Ltrs.*, 102 (2009) 020404; D. Starling et al., "Precision frequency measurements", *Phys. Rev. A*, 82 (2010) 062822; and N. Brunner et al., "Measuring small longitudinal phase shifts . . . ", *Phys. Rev. Ltrs.*, 105 (2010) 010405.

SUMMARY

Conventional communication methods and systems yield disadvantages addressed by various exemplary embodiments of the present invention. In particular, a communication method is provided for securely transmitting a shared random key between first and second parties. The first party (Alice) has a mirror. The second party (Bob) has an interferometer pair that includes first, second and third beam splitters, and first and second detectors.

The process for various exemplary embodiments include: sending a plurality of photons from Bob into the interferometer at the first beam splitter; performing a first weak measurement on each photon as $|1\rangle\langle1|_1$ being a first pointer result; incorporating the first pointer result into a first time-ordered list $L_1$ for each photon; performing a second weak measurement by Alice on each photon that passes through the second beam splitter to the first mirror as $|1\rangle\langle1|_2$ being a second pointer result; incorporating the second pointer result into a second time-ordered list $L_2$ for each photon that passes through; recording identification as one of the first and second detectors that each photon arrives via the third beam splitter as respective first and second detector registrations.

The exemplary process further includes: distinguishing the first and second detector registrations into a third time-ordered list F for each photon; collecting the first and second detector registrations from the third time-ordered list F that correspond to the first time-ordered list $L_1$ as respective first and second detection lists $B_1$ and $B_2$; determining first and second averages of the respective first and second detection lists; and comparing the first and second averages to verify existence of a non-trivial difference that indicates secure communication status.

Additional exemplary embodiments provide a method that further includes: sending by the second party to the first party a transfer list from the second time-ordered list $L_2$ in one of an altered form to transmit a "0" and an unaltered form to transmit a "1", the altered form shifting elements of each the second pointer result; collecting the first and second detector registrations from the third time-ordered list F corresponding to the transfer list as respective third and fourth detection lists $A_1$ and $A_2$; multiplying respective elements from the first and third detection lists to obtain a first product list $R_1$, and from the second and fourth detection lists to obtain a second product list $R_2$; and determining third and fourth averages of respective the first and second product lists, such that the "0" sent from the second party corresponds to both the third and fourth averages being zero, and the "1" sent from the second party corresponds to a ratio between the third and fourth averages being minus one.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
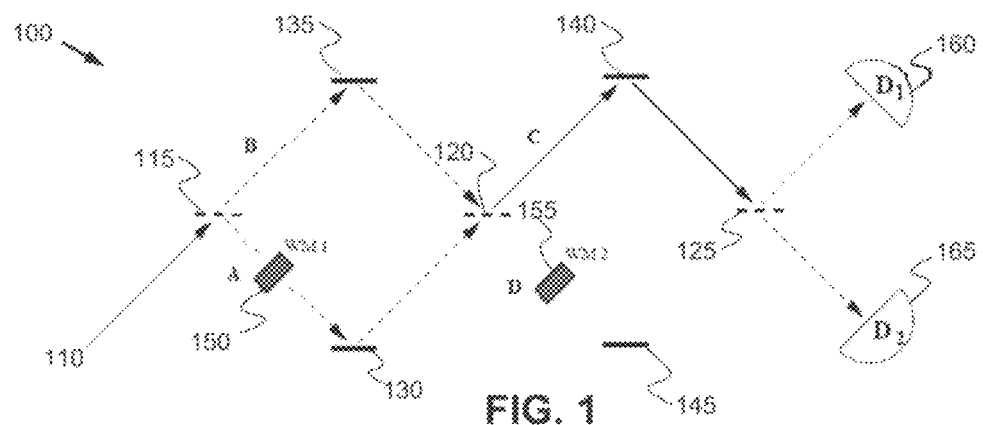
FIG. 1 is a plan diagram view of a twin Mach-Zehnder Interferometer.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

Various exemplary embodiments provide a secure communication method that utilizes the properties of the sequential weak values of a quantum observable to prevent eavesdropping. Due to the different quantum resource utilized, the exemplary communication protocol potentially has advantages over traditional quantum key distribution (QKD) methods. A fundamentally better tolerance to optical losses represents one very important potential advantage.

This disclosure describes a weak value method to enable communication of a shared secure key between two parties (Alice and Bob) that does not rely on traditional encryption methods, nor the use of conventional QKD methods. This exemplary quantum communication (QC) process remains nevertheless secure against an eavesdropper (Eve). This weak value communication protocol utilizes the properties of quantum systems in a novel manner to enable security. Instead of relying on the no-cloning property as does single photon based QKD, or Bell non-locality as does entanglement based QKD, this exemplary communication protocol utilizes the resource of the temporal non-locality of weak values of a quantum system.

Alice possesses a "raw key" list of random binary values. On conclusion of transmitting the raw key's elements, Alice and Bob implement classical information error correction and privacy amplification to distill a smaller shared private key that is secure. These techniques of error correction and privacy amplification are well established in the art. See e.g., C. Bennett et al., "Generalized Privacy Amplification", *IEEE Trans. on Info. Theory*, 41 (1995) 1915.

In association with QKD communication protocol, a brief review of the concepts of weak measurement and weak values is presented. Y. Aharonov introduced the notion of the weak value of a quantum mechanical observable over two decades ago (in above citations). This weak value is experimentally obtained from the result of measurements performed upon a pre-selected and post-selected (PPS) ensemble of quantum systems when the interaction between the measurement apparatus and each system is sufficiently weak.

Unlike the standard strong measurement of a quantum mechanical observable, which disturbs the measured system and "collapses" its state into an eigenstate of the observable, a weak measurement does not appreciably disturb the quantum system, and yields the weak value as the measured value of the observable. This is possible because very little information about the observable is extracted in a single weak measurement. Experimentally determining the weak value requires performing weak measurements on each member of a large ensemble of identical PPS systems and averaging the resulting values.

The standard (i.e., conventional) formulation of quantum mechanics describes a quantum system at a reference time $t_0$ using a state evolving from the past to $t_0$. The time-symmetric reformulation of quantum mechanics (TSQM), described in Reznik et al., uses also a second state which can be interpreted as a state evolving backward in time from the future to $t_0$. The weak values measured at time $t_0$ are influenced by this post-selected state. Many experiments have verified the surprising and counter-intuitive aspects of weak values, e.g., weak values can lie far outside the associated observable's eigenvalue spectrum and can be complex valued, as reported in the Hardy's paradox references cited above.

Weak measurements can be described using the general von Neumann model of quantum measurement. See the Aharanov references and J. Tollaksen, "Pre- and post-selection . . . ", *J. of Phys. A*, 40 (2007) 9033. Consider an observable $\hat{A}$ (i.e., a quantum physical characteristic subject to observation) pertaining to a quantum system pre-selected to be in the ket state $|\psi_{in}\rangle$, where $\psi_{in}$ represents the pre-select wave-function of the vector space. The interaction Hamiltonian $H_{int}$ describing the system and measuring device (MD) is the interaction:

$$H_{int} = -g(t)\hat{Q}_{MD}\hat{A}, \quad (1)$$

where $\hat{Q}_{MD}$ is the position operator for the MD and $g(t)$ is the interaction's coupling strength.

The evolution operator $U_{meas}$ for the system and MD is then given by the relation:

$$U_{meas} = \exp[-ig\hat{Q}_{MD}\hat{A}], \quad (2)$$

where the coupling strength g, defined by $g=\int g(t)dt$, is integrated over the interaction time interval $2\epsilon$ (from time $t_0-\epsilon$ to $t_0+\epsilon$). The measurement interaction is weakened by minimizing $g\Delta Q_{MD}$. Let the MD's initial state $|\Phi\rangle$ be a real Gaussian pointer with unit variance in momentum. Then the weakness of the measurement can be established (i.e., set) by setting $g \ll 1$, and $\Delta Q_{MD}=1$. This enables the following approximation:

$$\exp[-ig\hat{Q}_{MD}\hat{A}]|\psi_{in}\rangle|\Phi\rangle \simeq [1-ig\hat{Q}_{MD}\hat{A}]a_i|\Phi\rangle | $$
$$a_i \langle|\Phi\rangle, \quad (3)$$

where $|a_i\rangle$ represents the eigenstate of the operator $\hat{A}$ with eigenvalue $a_i$.

The final state of the measuring device can be seen to be a superposition of Gaussians in momentum space each of which is shifted by $ga_i$ where the $a_i$ are eigenvalues of $\hat{A}$. Thus, MD is a Gaussian with the mean shifted by $g\langle\hat{A}\rangle$. The measurement can be shown to yield "information without disturbance" in the limit of vanishing g, by the following process. First, the important result from Tollaksen indicates that:

$$\hat{A}|\Psi\rangle = \langle\hat{A}\rangle|\Psi\rangle + \Delta A|\Psi_\perp\rangle, \quad (4)$$

where $\Delta A$ is the variance of $\hat{A}$, and $|\Psi_\perp\rangle$ is a disturbance state such that $\langle\Psi|\Psi_\perp\rangle=0$, (i.e., zero probability amplitude for $\Psi$ collapsing to $\Psi_\perp$). This obtains:

$$[1-ig\hat{Q}_{MD}\hat{A}]|\psi_{in}\rangle = [1-ig$$
$$\hat{Q}_{MD}\langle\hat{A}\rangle]|\psi_{in}\rangle - ig\hat{Q}_{MD}\Delta A|\psi_{in\perp}\rangle. \quad (5)$$

From this one can observe that the probability of the state remains unchanged after the weak measurement interaction constitutes:

$$\langle|\psi_{in}\rangle\langle\psi_{in}|\rangle = \frac{1+g^2(\hat{Q}_{MD})^2\langle\hat{A}\rangle^2}{1+g^2(\hat{Q}_{MD})^2\langle\hat{A}^2\rangle} \to 1, \text{ as } g \to 0. \quad (6)$$

Also the probability that the state is disturbed can be given by the relation:

$$\langle |\psi_{in\perp}\rangle\langle\psi_{in\perp}|\rangle = \frac{g^2(\hat{Q}_{MD})^2(\Delta A)^2}{1+g^2(\hat{Q}_{MD})^2\langle\hat{A}^2\rangle} \to 1, \text{ as } g \to 0. \quad (7)$$

The probability to disturb the state falls off as $g^2$, while the shift in the measurement pointer is only reduced linearly in coupling strength g. This establishes that in principle one can couple a measuring device to a system and in the weak limit obtain information about an observable, with minimal disturbance to the state (i.e., such that the state is not significantly disturbed). This idealization neglects terms $g^2$ and higher.

The results of a weak measurement for a member of a PPS ensemble can be determined by rewriting the expectation value of $\hat{A}$ as:

$$\langle\hat{A}\rangle = \langle\psi_{in}|\left[\sum_j |\psi_{fin}\rangle_j\langle\psi_{fin}|\right]|\psi_{in}\rangle \quad (8)$$

$$= \sum_j |_j\langle\psi_{fin}|\psi_{in}\rangle|^2 \frac{_j\langle\psi_{fin}|\hat{A}|\psi_{in}\rangle}{_j\langle\psi_{fin}|\psi_{in}\rangle},$$

where j represents the summation increment for the eigenvalues of the observable that is strongly measured to produce the final state of the system. Thus, $|\psi_{fin}\rangle_j$ is the post-selected final state of the system where the $j^{th}$ eigenvalue is observed.

With the states $|\psi_{fin}\rangle_j$ interpreted as the outcomes of the final ideal measurements on the system, then the specification of a particular j determines a particular PPS ensemble (assuming that all of the initial states are identical). The weak value of the observable $\hat{A}$ for the system (of the j increment) preselected in the state $|\psi_{in}\rangle$ and post-selected in the state $|\psi_{fin}\rangle$ is then defined to be the quantity:

$$(A_w)^j \equiv \frac{_j\langle\psi_{fin}|\hat{A}|\psi_{in}\rangle}{_j\langle\psi_{fin}|\psi_{in}\rangle}. \quad (9)$$

The expectation value of any observable can be interpreted as an average of weak values $(A_w)^j$ taken over all of the different PPS ensembles. The weighting factor $|_j\langle\psi_{f\,in}|\hat{A}|\psi_{in}\rangle|^2$ represents the probability of any single system to belong to the particular PPS defined by the outcome state $|\psi_{fin}\rangle$. The wave-function of the measuring device after the weak measurement interaction and the post-selection is given by:

$$\langle P_{MD}|\langle\psi_{fin}|\exp[-ig\hat{Q}_{MD}\hat{A}]\rangle|\Phi\rangle \cong \langle P_{MD}|\langle\psi_{fin}|\psi_{in}\rangle \quad (10)$$

$$\left\{1+ig\hat{Q}_{MD}\frac{\langle\psi_{fin}|\hat{A}|\psi_{in}\rangle}{\langle\psi_{fin}|\psi_{in}\rangle}\right\}|\psi_{in}\rangle\bigg|\Phi\rangle$$

$$= \langle\psi_{fin}|\psi_{in}\rangle\langle P_{MD}|\exp[-ig\hat{Q}_{MD}\hat{A}]|\Phi\rangle,$$

where $P_{MD}$ represents momentum of the MD (measurement device).

Thus for a weak measurement of the observable $\hat{A}$ on a particular member of a PPS ensemble, the MD state is shifted by the weak value $A_w$ and the expectation value of the MD momentum will be $\langle P_{MD}\rangle = g\text{Re}(A_w)$. The weak value $A_w$ is in general complex and its magnitude can lie far outside operator $\hat{A}$'s eigenvalue spectrum. Note that because the interaction is very weak, the shift is very small in relation to the uncertainty of the MD. This indicates that a sufficiently large ensemble of identical PPS systems and measuring devices would be necessary in order to accurately determine the pointer shift and therefore accurately determine the weak value.

After the post-selection is made and every MD can be associated with a particular PPS ensemble, each of the MD systems is ideally measured, collapsing its wavefunction to a particular pointer value. By taking the average of all pointer values from the MD's for each PPS ensemble one can determine the weak value of the observable with an uncertainty that is proportional to $1/\sqrt{N}$, where N is the number of members of the particular PPS ensemble.

In the more general case when the system being measured evolves in time between the initial pre-selection ($t=t_{in}$) and the weak measurement interaction ($t=t_0$) via the unitary U, as well as from the weak measurement until the final post-selection ($t=t_{fin}$) via V, the weak value is given by:

$$A_w \equiv \frac{\langle\psi_{fin}|\hat{A}|\psi_{in}\rangle}{\langle\psi_{fin}|\psi_{in}\rangle}. \quad (11)$$

One can consider the weak measurement of two different observables, $\hat{A}_1$ and $\hat{A}_2$, measured at two different times $t_1$ and $t_2$, between the initial and final states of the system. The system evolves under U from $|\psi_{in}\rangle$ to $t=t_1$, under V between the two weak measurements (i.e., from $t=t_1$ until $t=t_2$), and finally under W from $t=t_2$ until the post-selected state $|\psi_{fin}\rangle_j$. The sequential weak value of $\hat{A}_1$ and $\hat{A}_2$ is defined in to be:

$$(A_2, A_1)_w = \frac{\langle\psi_{fin}|W\hat{A}_2V\hat{A}_1U|\psi_{in}\rangle}{\langle\psi_{fin}|WVU|\psi_{in}\rangle}, \quad (12)$$

in which U, V and W represent successive unitary states between weak measurements.

Experimentally, the sequential weak value (SWV) of the two observables can be determined from the results for the individual weak measurements. Empirical studies have shown that the expectation of the product of weak measurement results are related to the sequential weak value by:

$$\langle P_1 P_2\rangle = \frac{1}{2}g_1g_2 Re[(A_2, A_1)_w + (A_1)_w\overline{(A_2)_w}], \quad (13)$$

where $P_i$ is the pointer value obtained from the MD weakly measuring the observable $\hat{A}_i$. See G. Mitchison et al. "Sequential weak measurement", *Phys. Rev. A*, 76 (2007) 062105. This enables one to infer the SWV from the results of the individual weak measurements results of each operator. It is important to note that in general:

$$(A_2,A_1)_w \neq (A_2)_w \cdot (A_1)_w. \quad (14)$$

This connotes the central property of SWV's to be exploited in the secure communication protocol detailed in following paragraphs. This property is due to the correlation that exists between the statistics of the individual WM pointer results for the each member of the PPS ensemble.

This correlation results from the temporally nonlocal character of weak values arising from the weak value of an operator being defined by both the initial and final states of the system. The experimentally accessible quantity $\langle P_1 P_2 \rangle$ is quadratic in the coupling constants. This means that one would need to obtain many more individual WM pointer values in order to accurately determine the sequential weak value $(A_2, A_1)_w$ as compared to the individual weak values $(A_2)_w$ and $(A_1)_w$.

The following paragraphs describe embodiments for a particular quantum optical system and focus on the properties of the individual and sequential weak values of two specific operators. This optical arrangement constitutes a central part of the secure communication protocol. FIG. 1 illustrates the configuration under consideration of a twin Mach-Zehnder interferometer (MZI). The left portion MZI #1 is tuned so that all photons entering from the lower side always exit inside the second beam-splitter on the upper side.

In particular, FIG. 1 shows a plan diagram view 100 of the twin MZI. A source (e.g., a laser beam) emits a photon 110. The MZI includes three beam splitters 115, 120 and 125, along with four mirrors 130, 135, 140 and 145. In addition, the MCI includes first and second weak measurement devices: WM1 as 150 and WM2 as 155, as well as first and second detectors: $D_1$ as 160 and $D_2$ as 165. The photon 110 reaches the first beam splitter 115, which directs the photon to either path A through WM1 150 to the first mirror 130 or else to path B to the second mirror 135. Reflecting off either the first or second mirrors, the photon reaches the second beam splitter 120 and in this configuration approaches the third mirror 140 via path C rather than the fourth mirror 145 through WM2 155 via path D. Reflecting off the third mirror 140, the photon reaches the third beam splitter 125 to either the first or second deflectors 160, 165.

In this example, the basis state $|0\rangle$ means that the photon 110 is on the upper side of the beam splitter and state $|1\rangle$ means the photon 110 is on the lower side. Therefore, the general state of a photon ψ is represented by:

$$|\psi\rangle = \alpha|0\rangle + \beta|1\rangle, \qquad (15)$$

where α and β are probability coefficients for the upper and lower sides.

Weak measurements can be performed of the operator $|1\rangle\langle 1|$ at two different points in time as shown the view 100. The operator $|1\rangle\langle 1|$ yields the probability that the photon occupies the lower side of the interferometer. Weak measurements of the operator therefore provide access to the weak values for the photon's occupation of paths A and D respectively, as well as access to the sequential weak value for the photon 110 to take the path AD through the apparatus.

The pre-selected state is defined by injecting the photon into the lower port of the first MZI, thus:

$$|\psi_{in}\rangle = |1\rangle, \qquad (16)$$

corresponding to injecting the photon 110 into the lower input port of the interferometer. This produces a state where the photon 110 is localized completely in the upper state $|0\rangle$ along path C inside of the right MZI as MZI #2. This is because:

$$BMB|1\rangle = -|0\rangle, \qquad (17)$$

where the beam-splitter operator B is denoted:

$$B = \frac{1}{\sqrt{2}}(|0\rangle\langle 1| + |1\rangle\langle 0| + iI), \qquad (18)$$

the mirror operator M is denoted:

$$M = iI, \qquad (19)$$

with I the identity.

If the photon 110 is post-selected to arrive at Detector $D_1$ as 160, then the final state is:

$$|\psi_{fin}\rangle = |0\rangle. \qquad (20)$$

The weak value of operator $|1\rangle\langle 1|$ inside of MZI #1 as 150, being denoted by $(|1\rangle\langle 1|_1)_w$, for photons that are members of the PPS ensemble defined by final state $|\psi_{fin}\rangle$ is:

$$(|1\rangle|1|_1)_w^{D_1} = \frac{\langle 0|BMBM(|1\rangle\langle 1|)B|1\rangle}{\langle 0|BMBMB|1\rangle} \qquad (21)$$

$$= \frac{\frac{-i}{\sqrt{2}}\langle 1|(|1\rangle\langle 1|)(|0\rangle + i|1\rangle)}{\frac{-i}{\sqrt{2}}\langle 1|(|0\rangle + i|1\rangle)} = +1.$$

The weak value for the operator $|1\rangle\langle 1|$ inside of MZI #2, $(|1\rangle\langle 1|_2)_w$, for photons in the same PPS ensemble is:

$$(|1\rangle\langle 1|_2)_w^{D_2} = \frac{\langle 0|B(|1\rangle\langle 1|)MBMB|1\rangle}{\langle 0|BMBMB|1\rangle} \qquad (22)$$

$$= \frac{-i\langle 0|B(|1\rangle\langle 1|)|0\rangle}{-i\langle 0|B|0\rangle} = 0.$$

Hence, the weak value for the photon's occupation of path D is zero. One should note that:

$$(|1\rangle\langle 1|_2)_w = 0 \qquad (23)$$

for both PPS ensembles, and so the weak value of occupation of path C is equal to the expectation value, $$(|1\rangle\langle 1|_2)_w = \langle 1|\langle 1|_2\rangle = 0 \qquad (24)$$

This is expected given the complete destructive interference for this path. Due to the slight disturbance of the first weak measurement in MZI #1, the actual expectation value for MZI #2 can be established as:

$$\langle 1|\langle 1|_2\rangle = g_1^2, \qquad (25)$$

where $g_1$ is the coupling constant for WM1 as 150, so here again one obtains the approximation $g_1^2 \cong 0$.

Finally, one can calculate the sequential weak value for the occupation of the combined path AD:

$$(|1\rangle\langle 1|_2, |1\rangle\langle 1|_1)_w^{D_1} = \frac{\langle 0|BM(|1\rangle\langle 1|)BM(|1\rangle\langle 1|)B|1\rangle}{\langle 0|BMBMB|1\rangle} = \qquad (26)$$

$$\frac{\frac{1}{2}\langle 0|B|1\rangle}{-i\langle 0|B|0\rangle} = \frac{\frac{1}{2\sqrt{2}}\langle 1|(|0\rangle + i|1\rangle)}{\frac{-i}{\sqrt{2}}\langle 0|(|1\rangle + i|0\rangle)} = +\frac{1}{2}.$$

For the PPS ensemble defined by photons arriving at Detector $D_2$ as 165 this weak value is:

$$(|1\rangle\langle 1|_2, |1\rangle\langle 1|_1)_w^{D_2} = \frac{\langle 1|BM(|1\rangle\langle 1|)BM(|1\rangle\langle 1|)B|1\rangle}{\langle 1|BMBMB|1\rangle} = \qquad (27)$$

$$\frac{\frac{1}{2}\langle 1|B|1\rangle}{-i\langle 1|B|0\rangle} = \frac{\frac{1}{2\sqrt{2}}\langle 1|(|0\rangle + i|1\rangle)}{\frac{-i}{\sqrt{2}}\langle 1|(|1\rangle + i|0\rangle)} = -\frac{1}{2}.$$

From this one can observe that:

$$(|1\rangle\langle 1|_2, |1\rangle\langle 1|_1)_w \neq (|1\rangle\langle 1|_1)_w \cdot (|1\rangle\langle 1|_2)_w, \qquad (28)$$

such that the inequality signifies that the sequential weak value encodes correlations between the local weak measurement results of each photon 110.

Figure 2:
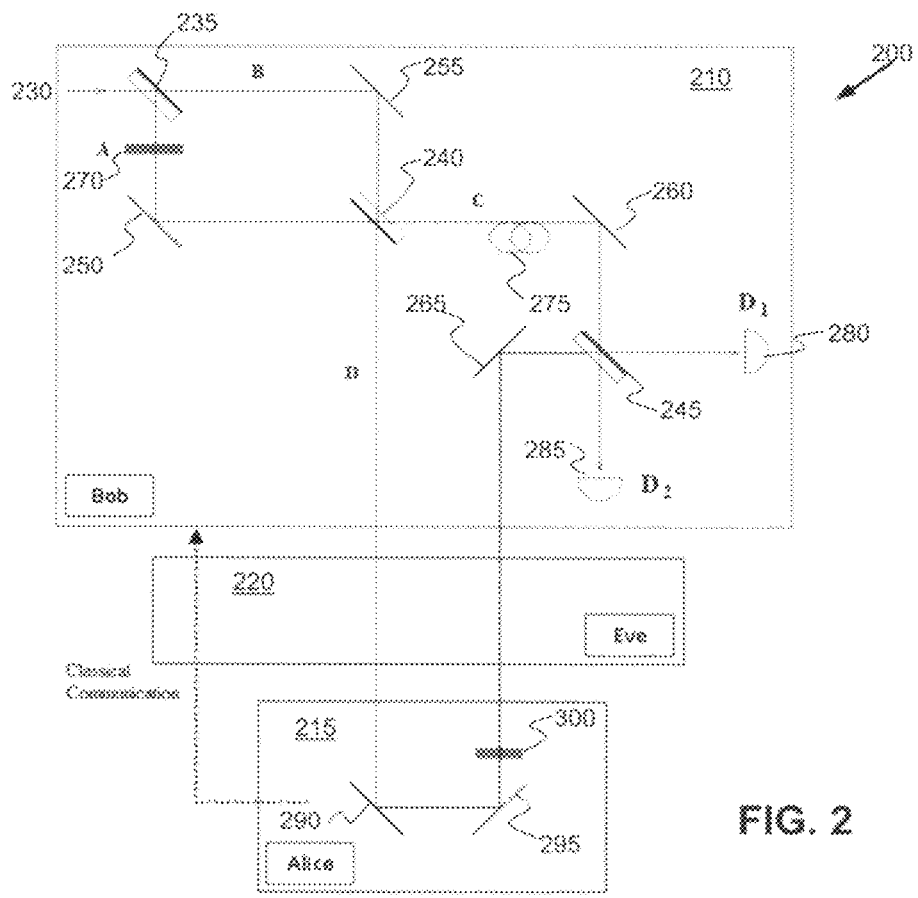
FIG. 2 is a plan diagram view of a communication arrangement.

FIG. 2 provides a plan diagram view 200 of a communication system between Bob 210 and Alice 215, with Eve 220 intercepting the trans-mission via classical eavesdropping techniques. Bob 210 uses a photon 230 to provide a communication signal. Bob's system includes three beam splitters 235, 240 and 245, four mirrors 250, 255, 260, and 265, two weak measurement devices 270, 275, and two detectors $D_1$ as 280 and $D_2$ as 285.

The photon 230 passes divides at the first splitter 235 either by path A through the first device 270 to reflect off the first mirror 250 or by path B to reflect off the second mirror 250. Both reflections direct the photon to the second splitter 240 that directs the photon 230 either by path C through the second device 275 to reflect off the third mirror 260 or else by path D towards Alice 215.

For path C, the photon 230 reflects off the third mirror 260 to reach the third splitter 245 and be directed to either the first or second detector 280, 285. Alice 215 has fifth and sixth mirrors 290, 295 and a third device 300. For path D, the photon 230 reaches the fifth mirror 290 to reflect off the sixth mirror 295 through the third device 300 and returns to Bob 210. Upon returning, the photon 230 reflects off the fourth mirror 265 to the third splitter 245 towards either detector 280, 285.

The purpose of this exemplary protocol is to enable Alice to send Bob a single classical bit of information such that the eavesdropper Eve is unable to obtain the bit. This process is described in the following eleven steps described below.

Step #1. Alice generates a list of random binary values of length K. This list will be referred to as the "raw key" henceforth. For each element of this list, the following steps (#2 through #11) are implemented.

Step #2. Bob sends N single photons (photon i at time $t_i$) into the interferometer as shown in the view 200. Each photon 210 is input into the same port so that each has:

$$|\psi_{in}\rangle = |1\rangle, \qquad (29)$$

as with eqn. (16).

Step #3. Bob performs a weak measurement (with coupling strength $g_B$) of $|1\rangle\langle 1|_1$ (occupation of path A) on each photon as it passes through MZI #1. Bob collects the individual pointer results into a list $L_1$ ordered by time.

Step #4. Alice performs a weak measurement (with coupling strength $g_A$) of $|1\rangle\langle 1|_2$ (occupation of path D) on each photon as in passes through MZI #2. Alice collects the individual pointer results into a time ordered list $L_2$.

Step #5. Bob records the detector at which each photon arrives. Bob collects this into a time ordered list F. Using F, Bob collects the subset of $L_1$ associated with photons that arrived at detector $D_1$ and puts these elements in a time ordered list $B_1$. Similarly for the subset associated with detector $D_2$, Bob creates a list $B_2$.

Step #6. Bob calculates the arithmetic means (i.e., averages) $\mu_1$ and $\mu_2$ of lists $B_1$ and $B_2$. These should yield the values:

$$\mu_1 = g_B Re[(|1\rangle\langle 1|_1)_w^{D_1}] = g_B \cdot 1, \qquad (30)$$

and $$\mu_2 = g_B Re[(|1\rangle\langle 1|_1)_w^{D_2}] = g_B \cdot 0, \qquad (31)$$

where $g_B$ is the coupling constant for Bob's weak measurement. However, if Eve were to perform a projective measurement on each of the photons along path D then Bob would instead obtain the results:

$$\mu_1 = \mu_2 = g_B \cdot \frac{1}{2}. \qquad (32)$$

This is because Eve's measurement will break the correlation between Bob's weak measurement results and the photons' post-selection results. (The reason that Eve must perform an ideal measurement on the photons in order to eavesdrop is discussed below.)

Step #7. If Bob finds that the arithmetic means $\mu_1$ and $\mu_2$ are too far from the expected values, he informs Alice that the channel is not secure and suggests that they begin the protocol over again. If Bob is satisfied that the weak values for $(|1\rangle\langle 1|_1)_w$ are 0 and 1 for the two PPS ensembles, then Bob can instruct Alice to proceed.

Step #8. Alice chooses the value of the bit she wants to send to Bob by reading the current element of the raw key list. If the raw key element is "1", then she sends her list $L_2$ as is (i.e., without alteration) to Bob over an open classical channel. If the raw key element is "0", then she cyclically shifts the members of the list $L_2$ by a non-zero number of elements. Note that the mean value of $L_2$ is invariant under this permutation.

Therefore, Eve has no way (even in principle) to infer the bit value that Alice chose from the classical message alone. This is the reason that Eve has to interfere with the photons. Eve needs to correlate Alice's weak measurement pointer results with some other information available to her as eavesdropper. The only way to accomplish this is to (directly) measure the photons collapsing the photon's which-path state. Exemplary embodiments thereby provide an advantage by using the photon's which-path information as the quantum observable. By contrast, techniques that employ other observables, e.g., the photon's polarization, involve passing every photon between Alice and Bob making them all accessible to Eve. In exemplary embodiments, Eve only has access to a small fraction of the total number of photons.

Step #9. Bob assumes that the list Alice sent is still ordered in the same manner as his lists $L_1$ and F (i.e., no shift in $L_2$). Using the post-selection information in F, Bob collects the subset of $L_2$ associated with photons that arrived at detector $D_1$ and deposits them in a time ordered list $A_1$. Similarly for the subset associated with detector $D_2$, Bob creates the list $A_2$.

Step #10. Bob multiplies the elements of the lists $A_1$ and $B_1$ to get product list $R_1$, and multiplies the elements of $A_2$ and $B_2$ to get product list $R_2$.

Step #11. Bob calculates the arithmetic mean values, $v_1$ and $V_2$, of $R_1$ and $R_2$. For example, if $$v_1 = \frac{g_A g_B}{2} \cdot \left(\frac{1}{2}\right), \tag{33}$$

and $$v_2 = \frac{g_A g_B}{2} \cdot \left(-\frac{1}{2}\right), \tag{34}$$

then Bob infers that Alice sent a "1" as the raw key bit. Note that the ratio of the means $v_1 \div v_2$ for this case is $-1$. By contrast, if $$v_1 = 0, \text{ and } v_2 = 0, \tag{35}$$

then Bob infers that Alice sent a "0" as the raw key bit.

When the entire raw key has been successfully transmitted, Alice and Bob implement error correction and privacy amplification on the raw key in order to distill a shared, secure private key of length K'. This private key possesses a shorter length than the raw key length K, such that K'<K.

Artisans of ordinary skill will recognize that the processes for cataloging detector results, averaging lists, determining values of coupling constants, etc. can be performed by a general purpose electronic processor using software, by custom hardware or any other automated system. These processors may be integrated into a unitary device or represent application-specific components devoted to at least one particular task.

Security of the information transmitted to Bob rests on the inability of Eve to infer that Alice has permuted the order of her local weak measurement results that have been transmitted to Bob. Eve lacks any manner even in principle to use only the transmitted list to know the weak measurement because there is no statistical difference between them. Therefore Eve must have more information about the photons than just the (non-post-selected) weak value of $|1\rangle\langle 1|_2$.

Also, even in principle, Eve can't know the post-selection information (i.e., at which of the two detectors that each photon arrives) because this is determined and stored locally by Bob. Finally, Eve can't predict these values because each photon is equally likely to arrive at each detector.

Instead, the only action Eve can take is to perform her own pre- and/or post-selection on each photon as it passes. For instance, Eve can perform non-demolition ideal measurements of $|1\rangle\langle 1|$ on each photon before or after Alice's weak measurement.

In this manner, Alice's weak measurement results can now be placed into two different pre-selection ensembles, yielding different weak values when Eve does not observe a photon and when she does, then:

$$(|1\rangle\langle 1|_2)_w^{Eve0} = 0 \tag{36}$$

and $$(|1\rangle\langle 1|_2)_w^{Eve1} = 1, \tag{37}$$

respectively.

If these ensembles are large enough, Eve will be able to distinguish whether or not Alice has permuted her list of weak measurement pointer results. This is because if Alice permutes her results, the weak value that Eve calculates for the two pre-selected ensembles both must equal the expectation value:

$$\langle |1\rangle\langle 1|_2 \rangle = g_B^2. \tag{38}$$

Therefore Eve's task is to accurate measure the average of Alice's pointer results conditioned by not detecting a photon, $a_0$, and the average conditioned on detecting a photon $a_1$.

Now suppose that it takes M photons for Bob to accurately determine the weak value of $|1\rangle\langle 1|_1$ using his weak measurement results and post-selection information. Because the number of photons N, that Bob must send through the device in order to accurately determine Alice's bit choice is much larger than M, Eve could perform her own pre-selection measurements on each photon and would likely be able to determine the bit from the conditional averages of Alice's pointer results. However, Bob would very easily detect Eve's intervention because her pre-selection measurement along path D would have changed the weak value of his local weak measurement results of $|1\rangle\langle 1|_1$.

For details on the effect of which-path measurements on the weak values of an observable equivalent to Bob's, see J. Tollaksen et al., "Quantum interference experiments . . . ", New J. of Phys., 12 (2010) 013023. To detect Eve, Bob has the task (for the $D_1$ PPS ensemble) to distinguish between the two Gaussian probability distributions with means $$g_B \cdot \frac{1}{2} \text{ and } g_B \cdot 1$$

(with unit variance) defined by Bob's MD wavefunction with and without Eve's strong measurement, respectively.

Recall that the case of pre-selection provides from eqn. (24) the expectation value:

$$(|1\rangle\langle 1|_2) = 0. \tag{39}$$

In the case of pre-selection as in eqn. (39) however, in order to infer Alice's bit value, Eve must distinguish between two Gaussian distributions with means:

$$a_0 = g_A \cdot g_B^2, \tag{40}$$

$$a_0 = g_A \cdot 0, \tag{41}$$

(with unit variance) derived from Alice's weak measurement pointer state with coupling strength $g_A$.

As coupling strength $g_B$ is decreased, Eve's probability of gaining information about the bit decreases at a rate faster than Bob's probability of detecting Eve's interaction with the photon. Therefore for large N (which is required for weak measurements), Bob can always detect Eve with very high probability and alert Alice before she transmits her pointer values, thereby preventing Eve from obtaining the bit value.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for distributing a shared secure key between first and second parties (Alice and Bob), said first party having a mirror, said second party having an interferometer pair that includes first, second and third beam splitters, and first and second detectors, said first party possessing a transfer list of random binary values that constitutes a raw key, said method comprising:

sending a plurality of photons from the second party (Bob) into the interferometer pair at the first beam splitter;

performing a first weak measurement that incorporates a first coupling strength $g_A$ on each photon as $|1\rangle\langle 1|_1$ being a first pointer result;

incorporating said first pointer result into a first time-ordered list $L_1$ for said each photon;

performing a second weak measurement that incorporates a second coupling strength $g_B$ by the first party (Alice) on said each photon that passes through the second beam splitter to the mirror as $|1\rangle\langle 1|_2$ being a second pointer result;

incorporating said second pointer result into a second time-ordered list $L_2$ for said each photon that passes through;

recording identification as one of the first and second detectors at which said each photon arrives via the third beam splitter as respective first and second detector registrations;

collecting said first and second detector registrations into a third time-ordered list F that correspond to said first time-ordered list $L_1$ as respective first and second detection lists $B_1$ and $B_2$;

determining first and second averages of said respective first and second detection lists; and comparing said first and second averages to verify existence of a non-trivial difference that indicates secure key distribution status.

2. A method for distributing a shared secure key between first and second parties (Alice and Bob), said first party having a mirror, said second party having an interferometer pair that includes first, second and third beam splitters, and first and second detectors, said first party possessing a transfer list of random binary values that constitutes a raw key, said method comprising:

sending a plurality of photons from the second party (Bob) into the interferometer pair at the first beam splitter;

performing a first weak measurement on each photon as $|1\rangle\langle 1|_1$ being a first pointer result;

incorporating said first pointer result into a first time-ordered list $L_1$ for said each photon;

performing a second weak by the first party (Alice) on said each photon that passes through the second beam splitter to the mirror as $|1\rangle\langle 1|_2$ being a second pointer result;

incorporating said second pointer result into a second time-ordered list $L_2$ for said each photon that passes through;

recording identification as one of the first and second detectors at which said each photon arrives via the third beam splitter as respective first and second detector registrations;

collecting said first and second detector registrations into a third time-ordered list F that correspond to said first time-ordered list $L_1$ as respective first and second detection lists $B_1$ and $B_2$;

determining first and second averages of said respective first and second detection lists;

comparing said first and second averages to verify existence of a non-trivial difference that indicates secure key distribution status;

sending by the first party to the second party the transfer list from said second time-ordered list $L_2$ in one of an altered form to transmit a "0" and an unaltered form to transmit a "1", said altered form shifting elements of each said second pointer result;

collecting said first and second detector registrations from said third time-ordered list F corresponding to said transfer list as respective third and fourth detection lists $A_1$ and $A_2$;

multiplying respective elements from said first and third detection lists to obtain a first product list $R_1$, and from said second and fourth detection lists to obtain a second product list $R_2$; and determining third and fourth averages of respective said first and second product lists, such that said "0" sent from the second party corresponds to both said third and fourth averages being zero, and said "1" sent from the second party corresponds to a ratio between said third and fourth averages being minus one.

3. The method according to claim 1, further comprising:

distilling the transfer list of length K from the raw key into private list of length K' of a shared secure private key, such that K'<K, wherein said distilling includes error correction and privacy amplification of the raw key.

4. The method according to claim 2, wherein performing said first weak measurement incorporates a first coupling strength $g_A$, and performing said second weak measurement incorporates a second coupling strength $g_B$.

5. The method according to claim 4, wherein said non-trivial difference corresponds to said first average equaling said second coupling strength $g_B$, and said second average equaling zero.

6. The method according to claim 4, wherein absence of said nontrivial difference corresponds to said first and second averages both equaling one-half of said second coupling strength as $\frac{1}{2}g_B$.

7. The method according to claim 1, wherein the mirror represents a first mirror, the first party has a second mirror, and the interferometer pair of the second party further includes third, fourth, fifth and sixth mirrors for directing the photon to the beam splitters.

8. The method according to claim 4, wherein said "1" sent corresponds to said third average equaling one-fourth said first coupling strength multiplied by said second coupling strength as $\frac{1}{4}g_Ag_B$, and said fourth average equaling minus one-fourth said first coupling strength multiplied by said second coupling strength as $-\frac{1}{4}g_Ag_B$.

9. A method for communication, between first and second parties (Alice and Bob), said first party having a mirror, said second party having an interferometer pair that includes first, second and third beam splitters, and first and second detectors, said method comprising:

sending a plurality of photons from the second party (Bob) into the interferometer pair at the first beam splitter;

performing a first weak measurement on each photon as $|1\rangle\langle 1|_1$ being a first pointer result;

incorporating said first pointer result into a first time-ordered list $L_1$ for said each photon;

performing a second weak measurement by the first party (Alice) on said each photon that passes through the second beam splitter to the mirror as $|1\rangle\langle 1|_2$ being a second pointer result;

incorporating said second pointer result into a second time-ordered list $L_2$ for said each photon that passes through;

recording identification as one of the first and second detectors at which said each photon arrives via the third beam splitter as respective first and second detector registrations;

collecting said first and second detector registrations into a third time-ordered list F that correspond to said first time-ordered list $L_1$ as respective first and second detection lists $B_1$ and $B_2$;

determining first and second averages of said respective first and second detection lists;

comparing said first and second averages to verify existence of a non-trivial difference that indicates secure communication status;

sending by the first party to the second party a transfer list from said second time-ordered list $L_2$ in one of an altered form to transmit a "0" and an unaltered form to transmit a "1", said altered form shifting elements of each said second pointer result;

collecting said first and second detector registrations from said third time-ordered list F corresponding to said transfer list as respective third and fourth detection lists $A_1$ and $A_2$;

multiplying respective elements from said first and third detection lists to obtain a first product list $R_1$, and from said second and fourth detection lists to obtain a second product list $R_2$; and determining third and fourth averages of respective said first and second product lists, such that said "0" sent from the second party corresponds to both said third and fourth averages being zero, and said "1" sent from the second party corresponds to a ratio between said third and fourth averages being minus one.

10. The method according to claim 9, wherein performing said first weak measurement incorporates a first coupling strength $g_A$, and performing said second weak measurement incorporates a second coupling strength $g_B$.

11. The method according to claim 10, wherein said non-trivial difference corresponds to said first average equaling said second coupling strength $g_B$, and said second average equaling zero.

12. The method according to claim 11, wherein absence of said nontrivial difference corresponds to said first and second averages both equaling one-half of said second coupling strength $\frac{1}{2}g_B$.

13. The method according to claim 10, wherein said "1" sent corresponds to said third average equaling one-fourth said first coupling strength multiplied by said second coupling strength as $\frac{1}{4}g_A g_B$, and said fourth average equaling minus one-fourth said first coupling strength multiplied by said second coupling strength as $-\frac{1}{4}g_A g_B$.

14. A receiver device for a first party (Bob) to communicate with a second party (Alice) having a mirror, said device comprising:
an interferometer pair that includes:
first, second and third beam splitters, and
first and second detectors;
a weak measurement device;
a photon source that emits a plurality of photons to said first beam splitter;
a weak measurement device for performing a first weak measurement on each photon as $|1\rangle\langle 1|_1$ being a first pointer result;
an accumulator for incorporating said first pointer result into a first time-ordered list $L_1$ for said each photon;
a register for recording identification as one of said first and second detectors that said each photon arrives via the third beam splitter as respective first and second detector registrations;
a discriminator for distinguishing said first and second detector registrations into a third time-ordered list F for said each photon;
a collimator for collecting respective said first and second detector registrations from said third time-ordered list F that correspond to said first time-ordered list $L_1$ as respective first and second detection lists $B_1$ and $B_2$;
a processor for determining first and second averages of said respective first and second detection lists; and a comparator for comparing said first and second averages to verify existence of a non-trivial difference that indicates secure communication status.

15. The device according to claim 14, wherein
the second party (Alice) performs a second weak measurement on said each photon that passes through said second beam splitter to the mirror as $|1\rangle\langle 1|_2$ being a second pointer result, incorporating said second pointer result into a second time-ordered list $L_2$ for said each photon that passes through, and
the second party sends to the first party a transfer list from said second time-ordered list $L_2$ in one of an altered form to transmit a "0" and an unaltered form to transmit a "1", said altered form shifting elements of each said second pointer result, said device further including:
a collector for collecting respective said first and second detector registrations from said third time-ordered list F corresponding to said transfer list as respective third and fourth detection lists $A_1$ and $A_2$;
a multiplier for multiplying respective elements from said first and third detection lists to obtain a first product list $R_1$, and from said second and fourth detection lists to obtain a second product list $R_2$; and
a determiner for determining third and fourth averages of respective said first and second product lists, such that said "0" sent from the first party corresponds to both said third and fourth averages being zero, and said "1" sent from the first party corresponds to a ratio between said third and fourth averages being minus one.

16. The method according to claim 1, wherein said non-trivial difference corresponds to said first average equaling said second coupling strength $g_B$, and said second average equaling zero.

17. The method according to claim 1, wherein absence of said nontrivial difference corresponds to said first and second averages both equaling one-half of said second coupling strength as $\frac{1}{2}g_B$.

18. The method according to claim 1, wherein said "1" sent corresponds to said third average equaling one-fourth said first coupling strength multiplied by said second coupling strength as $\frac{1}{4}g_A g_B$, and said fourth average equaling minus one-fourth said first coupling strength multiplied by said second coupling strength as $-\frac{1}{4}g_A g_B$.

19. The method according to claim 2, further comprising:
distilling the transfer list of length K from the raw key into private list of length K' of a shared secure private key, such that K'<K, wherein said distilling includes error correction and privacy amplification of the raw key.

20. The method according to claim 2, wherein the mirror represents a first mirror, the first party has a second mirror, and the interferometer pair of the second party further includes third, fourth, fifth and sixth mirrors for directing the photon to the beam splitters.

21. The method according to claim 9, further comprising:
distilling the transfer list of length K from the raw key into private list of length K' of a shared secure private key, such that K'<K, wherein said distilling includes error correction and privacy amplification of the raw key.

22. The method according to claim 9, wherein the mirror represents a first mirror, the first party has a second mirror, and the interferometer pair of the second party further includes third, fourth, fifth and sixth mirrors for directing the photon to the beam splitters.

* * * * *